US012187278B1

(12) United States Patent
Rafieisakhaei et al.

(10) Patent No.: US 12,187,278 B1
(45) Date of Patent: Jan. 7, 2025

(54) SURROUNDING TRAFFIC SPEED MANAGEMENT SYSTEM

(71) Applicant: PlusAI, Inc., Santa Clara, CA (US)

(72) Inventors: Mohammadhussein Rafieisakhaei, Foster City, CA (US); Xiaoyu Huang, San Jose, CA (US)

(73) Assignee: PlusAI, Inc., Santa Clara, CA (US)

( * ) Notice: Subject to any disclaimer, the term of this patent is extended or adjusted under 35 U.S.C. 154(b) by 0 days.

(21) Appl. No.: 18/238,371

(22) Filed: Aug. 25, 2023

(51) Int. Cl.
*B60W 30/14* (2006.01)
*B60W 60/00* (2020.01)
*G08G 1/052* (2006.01)

(52) U.S. Cl.
CPC ........ *B60W 30/146* (2013.01); *B60W 60/001* (2020.02); *G08G 1/052* (2013.01); *B60W 2554/404* (2020.02)

(58) Field of Classification Search
CPC ............. B60W 30/146; B60W 60/001; B60W 2554/404; G08G 1/052
See application file for complete search history.

(56) References Cited

U.S. PATENT DOCUMENTS

| | | | | |
|---|---|---|---|---|
| 11,904,889 | B1* | 2/2024 | Lumb | B60W 40/04 |
| 2013/0245945 | A1* | 9/2013 | Morita | G08G 1/09675 |
| | | | | 701/533 |
| 2016/0171889 | A1* | 6/2016 | Park | G08G 1/0112 |
| | | | | 701/93 |
| 2019/0025843 | A1* | 1/2019 | Wilkinson | B60W 60/0027 |
| 2019/0310100 | A1* | 10/2019 | Yang | G08G 1/052 |
| 2021/0125227 | A1* | 4/2021 | Lee | B60W 60/001 |
| 2022/0144269 | A1* | 5/2022 | Deborne | B60W 30/095 |
| 2022/0185281 | A1* | 6/2022 | Noguchi | B60W 40/02 |
| 2023/0018303 | A1* | 1/2023 | Itou | B60W 60/0059 |
| 2023/0169343 | A1* | 6/2023 | Lin | G06N 3/08 |
| | | | | 706/25 |

FOREIGN PATENT DOCUMENTS

CN 110796854 A * 2/2020 ........... G08G 1/0129

* cited by examiner

*Primary Examiner* — Ian Jen
*Assistant Examiner* — Danielle M Jackson
(74) *Attorney, Agent, or Firm* — Sheppard Mullin Richter & Hampton LLP

(57) ABSTRACT

Methods, systems, and non-transitory computer-readable media are configured to perform operations comprising determining first speeds of first objects in a first lane and second speeds of second objects in a second lane; determining a first speed of traffic for the first lane based on the first speeds and a second speed of traffic for the second lane based on the second speeds; and generating a speed limit for a third lane based on the first speed of traffic and the second speed of traffic.

20 Claims, 12 Drawing Sheets

SURROUNDING TRAFFIC SPEED MANAGEMENT SYSTEM

FIELD OF THE INVENTION

The present technology relates to autonomous systems. More particularly, the present technology relates to adaptive speed management in autonomous systems.

BACKGROUND

An autonomous system for navigation of a vehicle can plan and control motion for the vehicle. The planning and control functions of the autonomous system rely on data about the vehicle and an environment in which the vehicle is travelling, including the position and movement of other vehicles and obstacles. The performance of the planning and control functions can depend on such data as the state of the vehicle and the conditions of the environment change. The performance of these functions can be especially challenging in different situations. As one example, a vehicle, such as a truck, that is travelling on a road should properly account for traffic in surrounding lanes to travel at an efficient and safe speed.

SUMMARY

Various embodiments of the present technology can include methods, systems, and non-transitory computer readable media configured to perform operations comprising determining first speeds of first objects in a first lane and second speeds of second objects in a second lane; determining a first speed of traffic for the first lane based on the first speeds and a second speed of traffic for the second lane based on the second speeds; and generating a desired upper speed bound for a third lane based on the first speed of traffic and the second speed of traffic.

In some embodiments, determining the first speed of traffic for the first lane based on the first speeds and the second speed of traffic for the second lane based on the second speeds comprises: determining a first average of the first speeds; comparing the first average of the first speeds with previous averages of speeds of traffic for the first lane; determining a second average of the second speeds; and comparing the second average of the second speeds with previous averages of speeds of traffic for the second lane.

In some embodiments, the desired upper speed bound is generated by a machine learning model, and wherein the machine learning model is trained to learn a nonlinear function to generate the desired upper speed bound.

In some embodiments, the desired upper speed bound is generated by a machine learning model, and wherein the machine learning model is trained to apply a predetermined function to generate the desired upper speed bound.

In some embodiments, the desired upper speed bound is generated by a machine learning model, and wherein the machine learning model is trained to apply an interpolation function between a minimum upper speed bound and a maximum upper speed bound to generate the desired upper speed bound.

In some embodiments, the desired upper speed bound is generated based on a plurality of upper speed bounds generated by a plurality of machine learning models.

In some embodiments, the desired upper speed bound is generated by a machine learning model, and wherein the machine learning model is trained based on instances of driving scenarios and speed ranges identified for the driving scenarios.

In some embodiments, the operations further comprise: determining a road geometry associated with the first lane and the second lane, wherein the desired upper speed bound for the third lane is generated based on the road geometry.

In some embodiments, the first speeds of first objects in the first lane are relative to a first direction of the first lane and the second speeds of second objects in the second lane are relative to a second direction of the second lane.

In some embodiments, the operations further comprise: causing a change in speed of a vehicle in the third lane based on the desired upper speed bound for the third lane.

It should be appreciated that many other embodiments, features, applications, and variations of the present technology will be apparent from the following detailed description and from the accompanying drawings. Additional and alternative implementations of the methods, non-transitory computer readable media, systems, and structures described herein can be employed without departing from the principles of the present technology.

Figure 1:
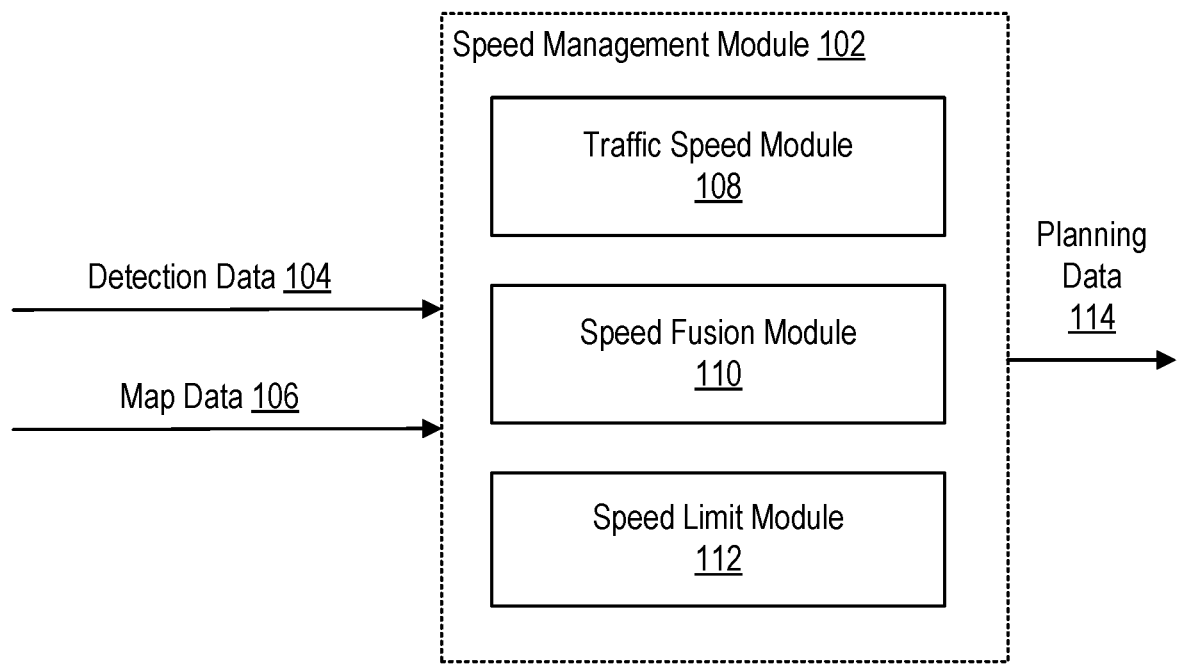
FIG. 1 illustrates an example system associated with adaptive speed management, according to embodiments of the present technology.

The figures depict various embodiments of the present technology for purposes of illustration only, wherein the figures use like reference numerals to identify like elements. One skilled in the art will readily recognize from the following discussion that alternative embodiments of the structures and methods illustrated in the figures can be employed without departing from the principles of the present technology described herein.

DETAILED DESCRIPTION

Approaches for Adaptive Speed Management

An autonomous system for navigation of a vehicle can plan and control motion for the vehicle. The planning and control functions of the autonomous system rely on data about the vehicle and an environment in which the vehicle is travelling, including the position and movement of other vehicles and obstacles. The performance of the planning and control functions can depend on such data as the state of the vehicle and the conditions of the environment change.

Understanding an environment in which a vehicle having an autonomous system for navigation (e.g., ego vehicle) is travelling is fundamental to planning and control functions of the vehicle. For example, a vehicle travelling in an environment can plan a safe and efficient route to travel in the environment based on an understanding of the environment. The understanding of an environment can involve detecting obstacles such as other vehicles, pedestrians, traffic signals, objects, etc. For example, a vehicle may improve safety and efficiency by managing its speed based on traffic around the vehicle.

However, under conventional approaches, managing a speed of a vehicle poses various technological challenges. Traffic on a road can move at varying speeds. Further, traffic in different lanes of the road can move at different speeds. For example, an autonomous system of a vehicle can attempt to navigate a road with traffic. The autonomous system may attempt to manage a speed of the vehicle by matching speed with a leading vehicle in front of the vehicle. That is, when the leading vehicle increases speed, the autonomous system accordingly increases speed of the vehicle. When the leading vehicle decreases speed, the autonomous system accordingly decreases speed of the vehicle. In this way, the autonomous system of the vehicle inefficiently applies throttle and braking in response to the speed of the leading vehicle. Further, the autonomous system of the vehicle fails to safely anticipate, for example, cut ins from other vehicles, upcoming slowdowns in traffic, or sudden stops in traffic. The foregoing illustration is just one example of how conventional approaches to managing a speed of a vehicle in an environment fail to adapt to myriad traffic related considerations in the environment. Thus, conventional approaches of autonomous systems for navigation face various challenges with respect to safe and efficient management of speed.

The present technology provides improved approaches for navigation of a vehicle that overcome the aforementioned and other technological challenges. In various embodiments, the present technology provides for adaptive speed management of a vehicle based on speeds of traffic in adjacent lanes. Speed of traffic in an adjacent lane can be determined based on detected speeds of obstacles (e.g., objects, vehicles) in the adjacent lane. For example, the detected speeds can be averaged and smoothed with past speeds of traffic in the adjacent lane to determine the speed of traffic in the adjacent lane. Based on the speeds of traffic in the adjacent lanes, a speed limit (e.g., desired upper speed bound) for a lane (e.g., ego lane) can be determined. The speed limit can serve as an upper bound for how fast the vehicle is allowed to travel. The present technology provides for various approaches to determining the speed limit. For example, the speed limit for the lane can be determined based on a machine learning model. The speed limit for the lane can be determined based on a guided model that is guided with a predetermined function. The speed limit for the lane can be determined based on a compensated model that is adjusted for certain ranges of speed. One or more of these approaches can be used to determine one or more speed limits for the lane. In cases where multiple approaches are used to determine multiple speed limits for the lane, a fusion speed limit can be determined based on a fusion of the multiple speed limits. Speed management of the vehicle (e.g., planning and control) can be based on the fusion speed limit as a desired upper speed bound. For example, a fusion speed limit generated based on speeds of traffic in adjacent lanes can be used as a desired upper speed bound for speed and evaluated with a speed of traffic in an ego lane to determine a safe speed of travel for the ego lane.

As an example, an autonomous system of a vehicle can navigate the vehicle through an environment that includes a three-lane highway. As the vehicle travels through the environment in the middle lane of the three-lane highway, the autonomous system of the vehicle can detect vehicles in the left lane of the three-lane highway and vehicles in the right lane of the three-lane highway. The autonomous system can determine speeds of the vehicles in the left lane and speeds of the vehicles in the right lane. For the left lane, the autonomous system can determine a speed of traffic based on an average of the speeds of the vehicles in the left lane. For the right lane, the autonomous system can determine a speed of traffic based on an average of the speeds of the vehicles in the right lane. Based on the speed of traffic of the left lane and the speed of traffic of the right lane, the autonomous system can determine a speed limit for the middle lane. In this example, the speed limit for the middle lane can be determined based on various approaches. The autonomous system can provide the speed of traffic of the left lane and the speed of traffic of the right lane to a machine learning model to determine a first speed limit. The autonomous system can provide the speed of traffic of the left lane and the speed of traffic of the right lane to a guided machine learning model to determine a second speed limit. The autonomous system can provide the speed of traffic of the left lane and the speed of traffic of the right lane to a compensated machine learning model to determine a third speed limit. The autonomous system can determine a fusion speed limit based on the first speed limit, the second speed limit, and the third speed limit. For example, the fusion speed limit can be the lowest speed limit of the first speed limit, the second speed limit, and the third speed limit. The autonomous system can plan and control the vehicle with respect to speed based on the fusion speed limit. For example, even if there are no vehicles travelling in front of the vehicle, the autonomous system can determine that upcoming traffic is likely based on the fusion speed limit and, accordingly, cause the vehicle to coast in the middle lane. As illustrated in this example, determining a speed limit, or desired upper speed bound, for an ego lane based on speeds of traffic in adjacent lanes provides improvements to speed management in autonomous systems by, for example, anticipating lane changes and other changes in traffic as well as facilitating overall smoother travel. Thus, the present technology provides improved approaches for adaptive speed management of a vehicle. These and other inventive features and related advantages of the various embodiments of the present technology are discussed in more detail herein.

FIG. 1 illustrates an example system 100 including a speed management module 102, according to some embodiments of the present technology. The speed management module 102 can provide support for various functions of an autonomous system of navigation of any type of vehicle (or ego vehicle), such as a truck. The speed management module 102 can generate planning data 114. The planning data 114 can include, for example, speed limit data and fusion speed limit data. The speed management module 102 can support or be implemented as part of a planning function of an autonomous system of a vehicle, such as a prediction and planning module 616 of an autonomous system 610 of FIG. 6, as discussed in more detail below. Alternatively or additionally, the safe navigation module 102 can support or be implemented as part of a control function of an autonomous system of a vehicle, such as a control module 618 of the autonomous system 610 of FIG. 6, as discussed in more detail below. The speed management module 102 can generate the planning data 114 based on various data, such as detection data 104 and map data 106, which are discussed in more detail below.

In some embodiments, some or all of the functionality performed by the speed management module 102 may be performed by one or more computing systems implemented in a vehicle. In some embodiments, some or all of the functionality performed by the speed management module 102 may be performed by one or more backend computing systems (e.g., remote from a vehicle). In some embodiments, some or all of the functionality performed by the speed management module 102 may be performed by one or more computing systems associated with (e.g., carried by) one or more users riding in a vehicle. In some embodiments, some or all data processed and/or stored by the speed management module 102 can be stored in a data store (e.g., local to the speed management module 102) or other storage system (e.g., cloud storage remote from speed management module 102). The components (e.g., modules, elements, etc.) shown in this figure and all figures herein, as well as their described functionality, are exemplary only. Other implementations of the present technology may include additional, fewer, integrated, or different components and related functionality. Some components and related functionality may not be shown or described so as not to obscure relevant details. In various embodiments, one or more of the functionalities described in connection with the speed management module 102 can be implemented in any suitable combinations. Functionalities of the speed management module 102 or variations thereof may be further discussed herein or shown in other figures.

As referenced or suggested herein, autonomous vehicles can include, for example, a fully autonomous vehicle, a partially autonomous vehicle, a vehicle with driver assistance, or an autonomous capable vehicle. The capabilities of autonomous vehicles can be associated with a classification system or taxonomy having tiered levels of autonomy. A classification system can be specified by, for example, industry standards or governmental guidelines. For example, based on the SAE standard, the levels of autonomy can be considered using a taxonomy such as level 0 (momentary driver assistance), level 1 (driver assistance), level 2 (additional assistance), level 3 (conditional assistance), level 4 (high automation), and level 5 (full automation without any driver intervention). Following this example, an autonomous vehicle can be capable of operating, in some instances, in at least one of levels 0 through 5. According to various embodiments, an autonomous capable vehicle may refer to a vehicle that can be operated by a driver manually (that is, without the autonomous capability activated) while being capable of operating in at least one of levels 0 through 5 upon activation of an autonomous mode. As used herein, the term "driver" may refer to a local operator (e.g., an operator in the vehicle) or a remote operator (e.g., an operator physically remote from and not in the vehicle). The autonomous vehicle may operate solely at a given level (e.g., level 2 additional assistance or level 5 full automation) for at least a period of time or during the entire operating time of the autonomous vehicle. Other classification systems can provide other levels of autonomy characterized by different vehicle capabilities.

The speed management module 102 can include a traffic speed module 108. The traffic speed module 108 can determine speed of traffic in a lane based on speeds of obstacles (e.g., objects, vehicles) in the lane. The speeds of obstacles in the lane can be determined based on detection data, such as detection data 104. The detection data can be based on sensor data. The detection data can be filtered to focus on vehicles in the lane. The detection data can include, for example, positions, locations, orientations, poses, velocities, and accelerations of the vehicles in the lane. In some cases, a velocity or speed of a vehicle can be used to determine a longitudinal speed, or a speed in a direction of the lane. A speed of traffic in the lane can be determined, for example, based on an average of the speeds of the obstacles in the lane. In some cases, the average can be weighted, for example, so that obstacles closer to an ego vehicle are weighted higher than obstacles farther from the ego vehicle. The average of the speeds of the obstacles can be smoothed (e.g., temporal smoothing) with previous speeds of traffic to reduce noise. For example, the average of the speeds of the obstacles can be limited to be within a selected threshold difference from a previous speed of traffic or an average of previous speeds of traffic. The speed of traffic in the lane can be determined based on the smoothed average of the speeds of the obstacles in the lane. This can be repeated for each adjacent lane to determine speeds of traffic in the adjacent lanes.

As an illustration, an autonomous system of a vehicle can navigate the vehicle in an environment. The autonomous system of the vehicle can detect first vehicles in an adjacent left lane and second vehicles in an adjacent right lane. Speeds of the first vehicles can be determined based on detection data for the first vehicles. The speeds of the first vehicles can be averaged. The average of the speeds of the first vehicles can be smoothed with previous speeds of traffic determined for the adjacent left lane. In this example, the average of the speeds of the first vehicles can be 25 miles per hour, and an average of the previous speeds of traffic can be 20 miles per hour. The average of the speeds of the first vehicles can be smoothed, or limited, to within a selected threshold difference from the average of the previous speeds of traffic. In some cases, the selected threshold difference for one lane (e.g., left lane) can be different from the selected threshold difference for another lane (e.g., right lane). In this average, the threshold difference can be 2 miles per hour and, therefore, the average of the speeds of the first vehicles can be smoothed to 22 miles per hour. The speed of traffic for the adjacent left lane can be determined to be 22 miles per hour based on the smoothed average of the speeds of the first vehicles. This can be repeated for the second vehicles in the adjacent right lane. Speeds of the second vehicles can be determined based on detection data for the second vehicles. The speeds of the second vehicles can be averaged. The average of the speeds of the second vehicles can be smoothed with previous speeds of traffic determined for the adjacent right lane. For example, the average of the speeds of the second vehicles can be 18 miles per hour, and an average of the previous speeds of traffic can be 19 miles per hour. As the average of the speeds of the second vehicles is within the threshold difference from the average of the previous speeds of traffic, the speed of traffic for the adjacent right lane can be determined to be 18 miles per hour based on the average of the speeds of the right vehicles. Many variations are possible.

The speed management module 102 can include a speed fusion module 110. The speed fusion module 110 can generate a speed limit for an ego lane based on speeds of traffic in adjacent lanes. The speed limit can be generated based on various approaches. The speed fusion module 110 can use one or more of the various approaches described herein to generate one or more speed limits. In a first approach, the speed fusion module 110 can generate a speed limit (e.g., upper speed bound) based on machine learning methodologies. A machine learning model (e.g., neural network) can be trained to learn a nonlinear fusion function for fusing speeds of traffic in adjacent lanes. The machine learning model can be trained to consider various factors, such as road geometry, increase in speed of traffic, decrease in speed of traffic, difference in speeds of traffic in adjacent lanes, regional settings (e.g., urban, suburban, highway, rural), geographical location, and class of vehicle (e.g., truck, sedan, SUV). For example, the machine learning model can be trained to consider road geometry, regional settings, and geographical location based on map data, such as map data 106. The machine learning model can be trained to account for various scenarios, such as high traffic scenarios, low traffic scenarios, and merging scenarios. Based on, for example, the speeds of traffic in adjacent lanes, the various factors, and the various scenarios, the machine learning model can be trained to generate a speed limit for an ego lane. The machine learning model can be trained based on training data that includes instances of driving scenarios. An instance of training data can include road test data for a driving scenario. The instance of training data can include speed ranges for the driving scenario that correspond with what drivers consider to be safe or comfortable speed ranges. The speed ranges can be determined based on surveys of the drivers where drivers can indicate what speed ranges are too fast, what speed ranges are too slow, and what speed ranges are safe or comfortable. The machine learning model can be trained based on the training data to generate speed limits within the speed ranges that are considered safe or comfortable. For example, an instance of training data can include road test data for a driving scenario involving a three-lane highway. Based on the road geometry, the speed of traffic in the left lane, and the speed of traffic in the right lane, safe or comfortable speed ranges can be determined for the driving scenario. A machine learning model can be trained based on the instance of training data to learn a nonlinear function that models the comfortable speed ranges for the driving scenario. Once trained, the machine learning model can be provided with speeds of traffic in adjacent lanes. The machine learning model can be provided with various factors for consideration, including, for example, road geometry, regional settings, and geographical location. Based on the speeds of traffic in the adjacent lanes and the various factors, the machine learning model can generate a speed limit that is considered safe or comfortable.

In a second approach, the speed fusion module 110 can generate a speed limit (e.g., upper speed bound) based on a guided machine learning model. The guided machine learning model can be provided with a predetermined function (e.g., fusion function, quadratic function, linear function). The guided machine learning model can be trained, using the predetermined function, to generate a speed limit for an ego lane based on speeds of traffic in adjacent lanes. The machine learning model can be trained to consider various factors, such as road geometry, increase in speed of traffic, decrease in speed of traffic, difference in speeds of traffic in adjacent lanes, regional settings (e.g., urban, suburban, highway, rural), geographical location, and class of vehicle. The machine learning model can be trained to account for various scenarios, such as high traffic scenarios, low traffic scenarios, and merging scenarios. The machine learning model can be trained to weigh the various factors and speeds of traffic. For example, the machine learning model can be trained to weigh a speed of traffic for an adjacent left lane greater than a speed of traffic for an adjacent right lane to account for tendencies of cut-ins from adjacent left lanes. The guided machine learning model can be trained based on training data that includes instances of driving scenarios. An instance of training data can include road test data for a driving scenario. The instance of training data can include speed ranges for the driving scenario that correspond with what drivers consider to be safe or comfortable speed ranges, speed ranges that are too fast, and speed ranges that are too slow. For example, speeds up to a legal speed limit can be divided into predetermined intervals (e.g., 3 miles per hour intervals, 5 miles per hour intervals). Drivers can indicate, for the driving scenario, which intervals are safe or comfortable, which intervals are too fast, and which intervals are too slow. The machine learning model can be trained to fit the predetermined function to align with the speed ranges, or intervals, that drivers consider to be safe or comfortable. For example, an instance of training data can include road test data for a driving scenario and intervals that drivers consider to be safe or comfortable, intervals that drivers consider to be too fast, and intervals that drivers consider to be too slow for the driving scenario. In this example, the machine learning model can be provided with a quadratic function to align with the safe or comfortable speed ranges. The machine learning model can be trained to adjust the quadratic function so that the vertex, or where the quadratic function saturates, is at the interval that most drivers consider to be safe or comfortable. Once trained, the machine learning model can be provided with speeds of traffic in adjacent lanes. The machine learning model can be provided with various factors for consideration, including, for example, road geometry, regional settings, and geographical location. Based on the speeds of traffic in the adjacent lanes and the various factors, the machine learning model can generate a speed limit that is considered safe or comfortable.

In a third approach, the speed fusion module 110 can generate a speed limit (e.g., upper speed bound) based on a compensated machine learning model. The compensated machine learning model can be provided with a predetermined function (e.g., fusion function, affine function, interpolation function). The machine learning model can be trained based on the predetermined function to compensate for a range of speed. For example, the machine learning model can be trained to generate a lower speed limit than would be provided by other machine learning models when the speeds of traffic in adjacent lanes are low to avoid generating an unsafely high speed limit. In some cases, the machine learning model can be trained to apply an interpolation function between a minimum allowed speed limit (e.g., minimum upper speed bound) and a maximum allowed speed limit (e.g., maximum upper speed bound) for certain speed ranges. The compensated machine learning model can be trained based on training data that includes instances of driving scenarios. An instance of training data can include road test data for a driving scenario. The instance of training data can include speed ranges for the driving scenario that correspond with what drivers consider to be safe or comfortable speed ranges. The speed ranges can be determined based on surveys of the drivers where drivers can indicate what speed ranges are too fast, what speed ranges are too slow, and what speed ranges are safe or comfortable. For a range of speed for which the machine learning model is to be trained to compensate, drivers can be surveyed for a minimum allowed speed limit and a maximum allowed speed limit for the driving scenario. The machine learning model can be trained to fit the predetermined function to align with the speed ranges that drivers consider to be safe or comfortable. The machine learning model can be trained to apply an interpolation function for a range of speed based on a minimum allowed speed limit and a maximum allowed speed limit that drivers consider to be safe or comfortable. For example, an instance of training data can include road test data for a driving scenario and speed ranges that drivers consider to be safe or comfortable. In this example, the speed ranges can fall within a speed range for which a machine learning model is to compensate. The instance of training data can include a minimum allowed speed limit and a maximum allowed speed limit indicated by the drivers to be safe or comfortable for the speed range. Once trained, the machine learning model can be provided with speeds of traffic in adjacent lanes. Based on the speeds of traffic in the adjacent lanes, the machine learning model can generate a speed limit that is considered safe or comfortable.

As an illustration, an autonomous system of a vehicle can navigate the vehicle in a middle lane of a three-lane highway. The autonomous system of the vehicle can determine a speed of traffic for an adjacent left lane based on detected speeds of vehicles in the adjacent left lane. The autonomous system of the vehicle can determine a speed of traffic for an adjacent right lane based on detected speeds of vehicles in the adjacent right lane. The speed of traffic for the adjacent left lane and the speed of traffic for the adjacent right lane can be provided, along with other data, such as road geometry described in map data, to a first machine learning model, a second guided machine learning model, and a third compensated machine learning model. The first machine learning model can generate a first speed limit based on the speed of traffic for the adjacent left lane and the speed of traffic for the adjacent right lane. The second guided machine learning model can generate a second speed limit based on the speed of traffic for the adjacent left lane and the speed of traffic for the adjacent right lane. The third compensated machine learning model can generate a third speed limit based on the speed of traffic for the adjacent left lane and the speed of traffic for the adjacent right lane. In this example, the first speed limit, the second speed limit, and the third speed limit can be different speed limits. A fusion speed limit can be generated based on the first speed limit, the second speed limit, and the third speed limit, as further described herein. Many variations are possible.

The speed management module 102 can include a speed limit module 112. The speed limit module 112 can generate a fusion speed limit (e.g., desired upper speed bound) based on speed limits generated from speeds of traffic in adjacent lanes. The fusion speed limit can be an upper bound on how fast a vehicle is allowed to travel in an ego lane. In some cases, the fusion speed limit can be generated by selecting the lowest speed limit of the speed limits. The lowest speed limit can generally be considered to be a safer speed limit than the other speed limits. In some cases, the fusion speed limit can be generated by selecting a speed limit generated by a machine learning model, a guided machine learning model, or a compensated machine learning model based on a range of speeds within which the speed limits fall. For example, if a first speed limit generated by a machine learning model, a second speed limit generated by a second guided machine learning model, and a third speed limit generated by a third compensated machine learning model are low (e.g., below a threshold speed limit), the third speed limit can be selected because the third compensated machine learning model is trained to compensate for low speeds. As another example, if the first speed limit, the second speed limit, and the third speed limit are high (e.g., above a threshold speed limit), the first speed limit, the second speed limit, or an average of the first speed limit and the second speed limit can be selected because the third compensated machine learning model, which is trained in this example to compensate for low speeds, may not be as appropriate as the first machine learning model or the second guided machine learning model.

The fusion speed limit can be used for planning and control of a vehicle. In some cases, the fusion speed limit can provide a lower speed limit than a speed limit generated based on speed of traffic in an ego lane or a legal speed limit. The fusion speed limit can facilitate planning and control of the vehicle at the lower speed limit to provide smooth travel that anticipates, for example, potential changes in traffic and potential cut-in maneuvers by other vehicles. For example, planning and control of a vehicle based on a fusion speed limit lower than a speed of traffic in an ego lane or a legal speed limit can involve coasting or braking when there is space in front of the vehicle. This allows the vehicle to, for example, anticipate upcoming traffic or a likely cut-in maneuver by another vehicle.

As an illustration, an autonomous system of a vehicle can navigate the vehicle through an environment with a multi-lane highway. The vehicle can be in the middle lane of the multi-lane highway. The autonomous system of the vehicle can determine speed limits based on a speed of traffic in an adjacent left lane and a speed of traffic in an adjacent right lane. A first speed limit can be generated based on a first machine learning model. A second speed limit can be generated based on a second guided machine learning model. A third speed limit can be generated based on a third compensated machine learning model. The autonomous system of the vehicle can generate a fusion speed limit based on the first speed limit, the second speed limit, and the third speed limit. In this example, the first speed limit, the second speed limit, and the third speed limit can be below a threshold speed limit (e.g., 15 miles per hour). Based on the first speed limit, the second speed limit, and the third speed limit being below the threshold speed limit, the autonomous system can select the third speed limit to be the fusion speed limit. The autonomous system can plan for and control the vehicle based on the fusion speed limit. For example, the autonomous system can cause the vehicle to coast instead of accelerating in the middle lane based on the fusion speed limit even though there may be sufficient space in front of the vehicle to accelerate. In this example, the speeds of traffic in the adjacent lanes can indicate there is upcoming traffic. Further, many drivers tend to try to change lanes into a lane perceived to be moving faster. Thus, by coasting instead of accelerating, the autonomous system can smoothly navigate the vehicle by managing its speed so as to avoid sudden braking due to the upcoming traffic or a cut-in maneuver by another vehicle. Many variations are possible.

Figure 2:
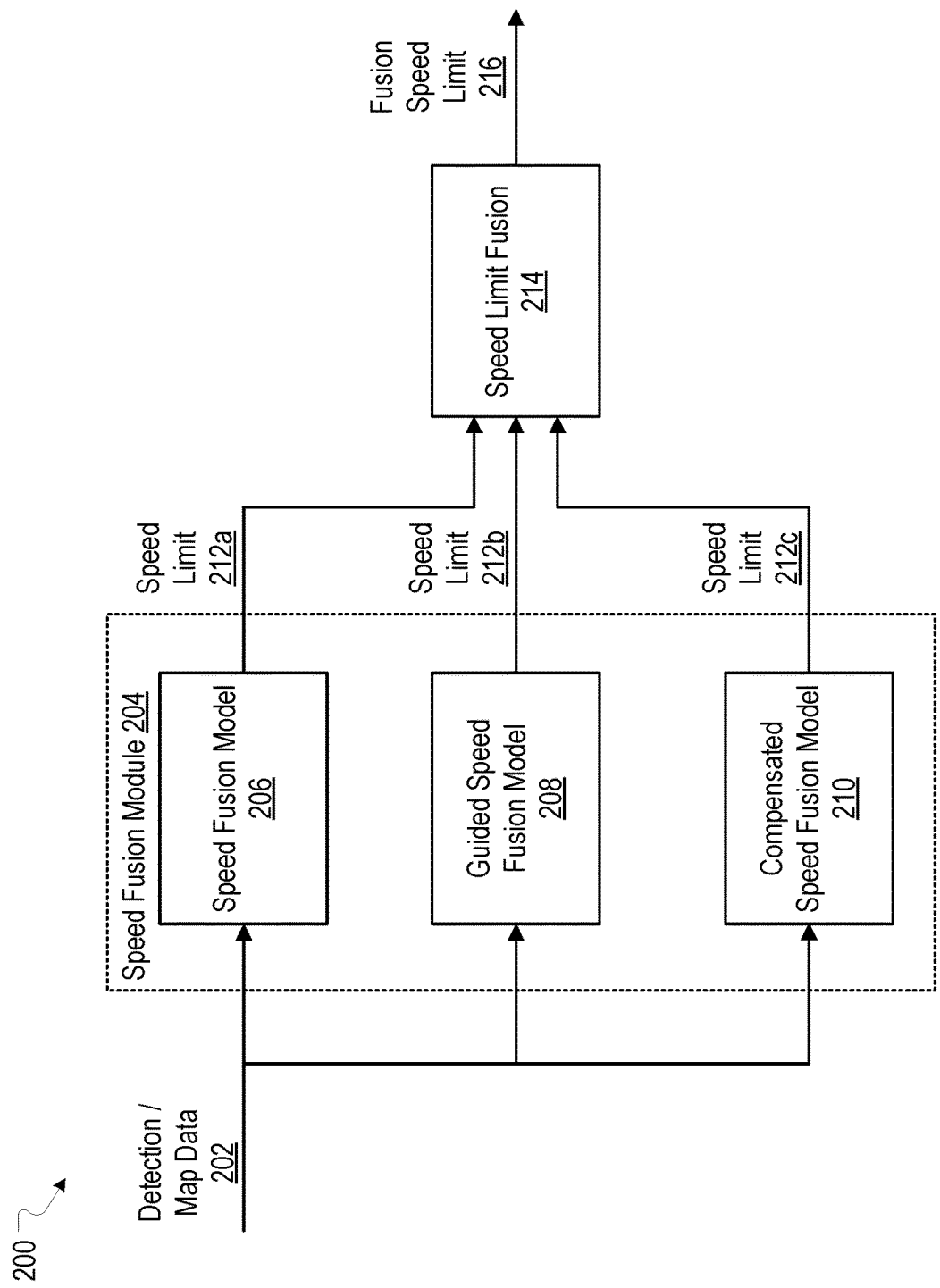
FIG. 2 illustrates an example block diagram associated with adaptive speed management, according to embodiments of the present technology.

FIG. 2 illustrates an example block diagram 200 associated with adaptive speed management, according to some embodiments of the present technology. The various functionality described herein for adaptive speed management can be performed by, for example, the speed management module 102 of FIG. 1. It should be understood that there can be additional, fewer, or alternative blocks, functionality, or steps performed in similar or alternative orders, or in parallel, based on the various features and embodiments discussed herein unless otherwise stated.

As illustrated in FIG. 2, generation of a fusion speed limit 216 can be based on a fusion of multiple machine learning models. In this example, speed fusion model 206, guided speed fusion model 208, and compensated speed fusion model 210 can be included in a speed fusion module 204 that generates speed limits 212a, 212b, 212c, respectively. The speed fusion model 206, the guided speed fusion model 208, and the compensated speed fusion model 210 can generate speed limits 212a, 212b, 212c based on detection/map data 202. The detection/map data 202 can include, for example, speeds of traffic in adjacent lanes and road geometry data. The speed fusion model 206 can generate speed limit 212a based on a machine learning model. The guided speed fusion model 208 can generate speed limit 212b based on a guided machine learning model. The compensated speed fusion model 210 can generate speed limit 212c based on a compensated machine learning model. Speed limit fusion 214 can generate fusion speed limit 216 based on the speed limits 212a, 212b, 212c. For example, speed limit fusion 214 can select the lowest of speed limits 212a, 212b, 212c to be fusion speed limit 216. Many variations are possible.

Figure 3A:
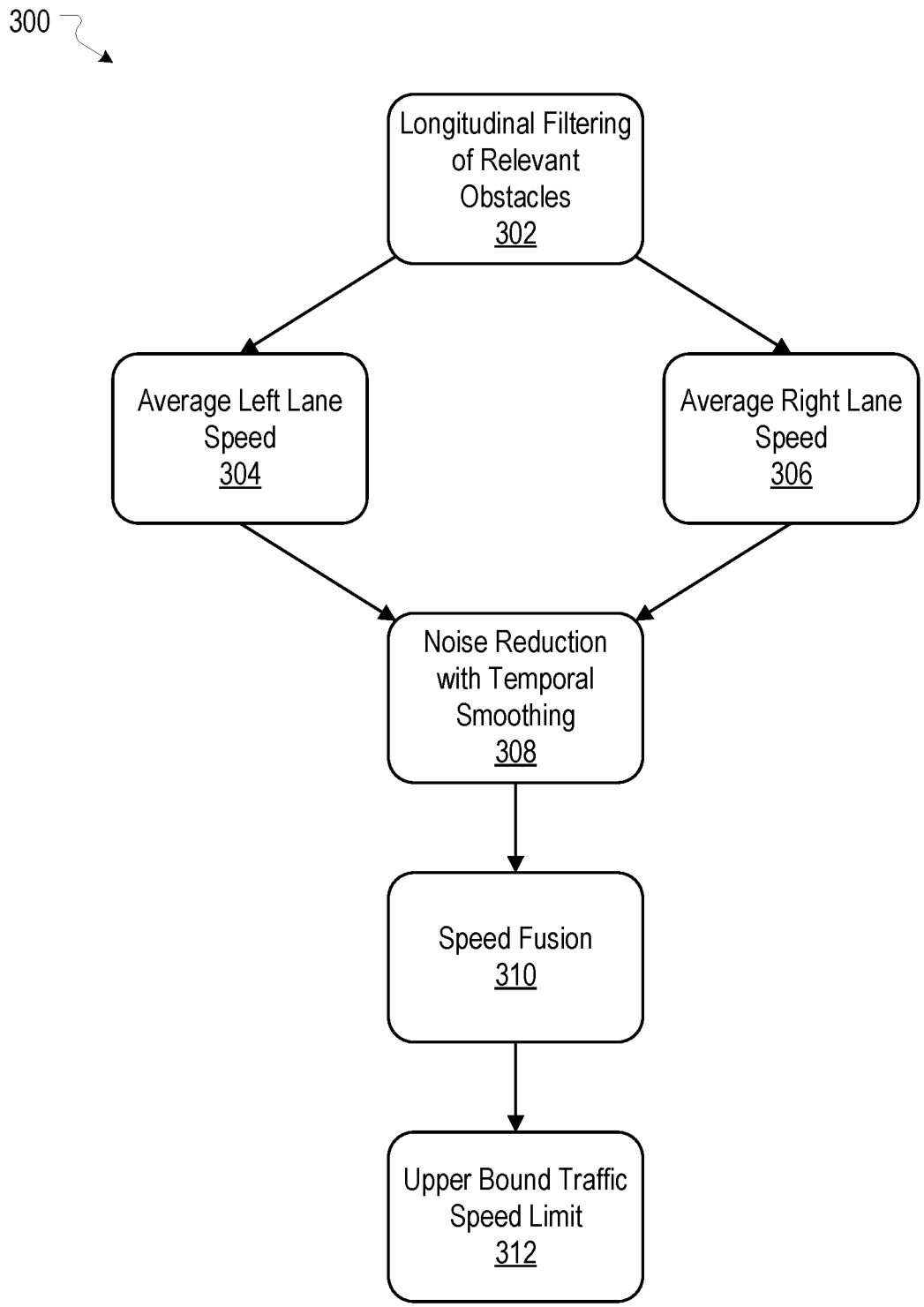
FIG. 3A illustrates an example flow associated with adaptive speed management, according to embodiments of the present technology.

FIG. 3A illustrates an example flow 300 associated with adaptive speed management, according to some embodiments of the present technology. The various functionality described herein for adaptive speed management can be performed by, for example, the speed management module 102 of FIG. 1. It should be understood that there can be additional, fewer, or alternative functionality or steps performed in similar or alternative orders, or in parallel, based on the various features and embodiments discussed herein unless otherwise stated.

As illustrated in FIG. 3A, the example flow 300 starts with longitudinal filtering of relevant obstacles 302. The longitudinal filtering of relevant obstacles 302 can determine speed of traffic in a lane by filtering obstacles that do not contribute to the speed of traffic (e.g., non-vehicles) and determining speed of the obstacles relative to the lane. Next, the example flow 300 determines an average left lane speed 304 and an average right lane speed 306. The average left lane speed 304 can be determined based on longitudinal speed of vehicles in the left lane. The average right lane speed 306 can be determined based on longitudinal speed of vehicles in the right lane. Next, the example flow 300 performs noise reduction with temporal smoothing 308. The average left lane speed 304 can be temporally smoothed with previous average left lane speeds to reduce noise. The average right lane speed 306 can be temporally smoothed with previous average right lane speeds to reduce noise. Next, the example flow 300 performs speed fusion 310 on the smoothed average left lane speed and the smoothed average right lane speed. Based on the speed fusion 310, the example flow 300 generates an upper bound traffic speed limit 312. The upper bound traffic speed limit 312 can be an upper bound for how fast a vehicle can travel in an ego lane. Many variations are possible.

Figure 3B:
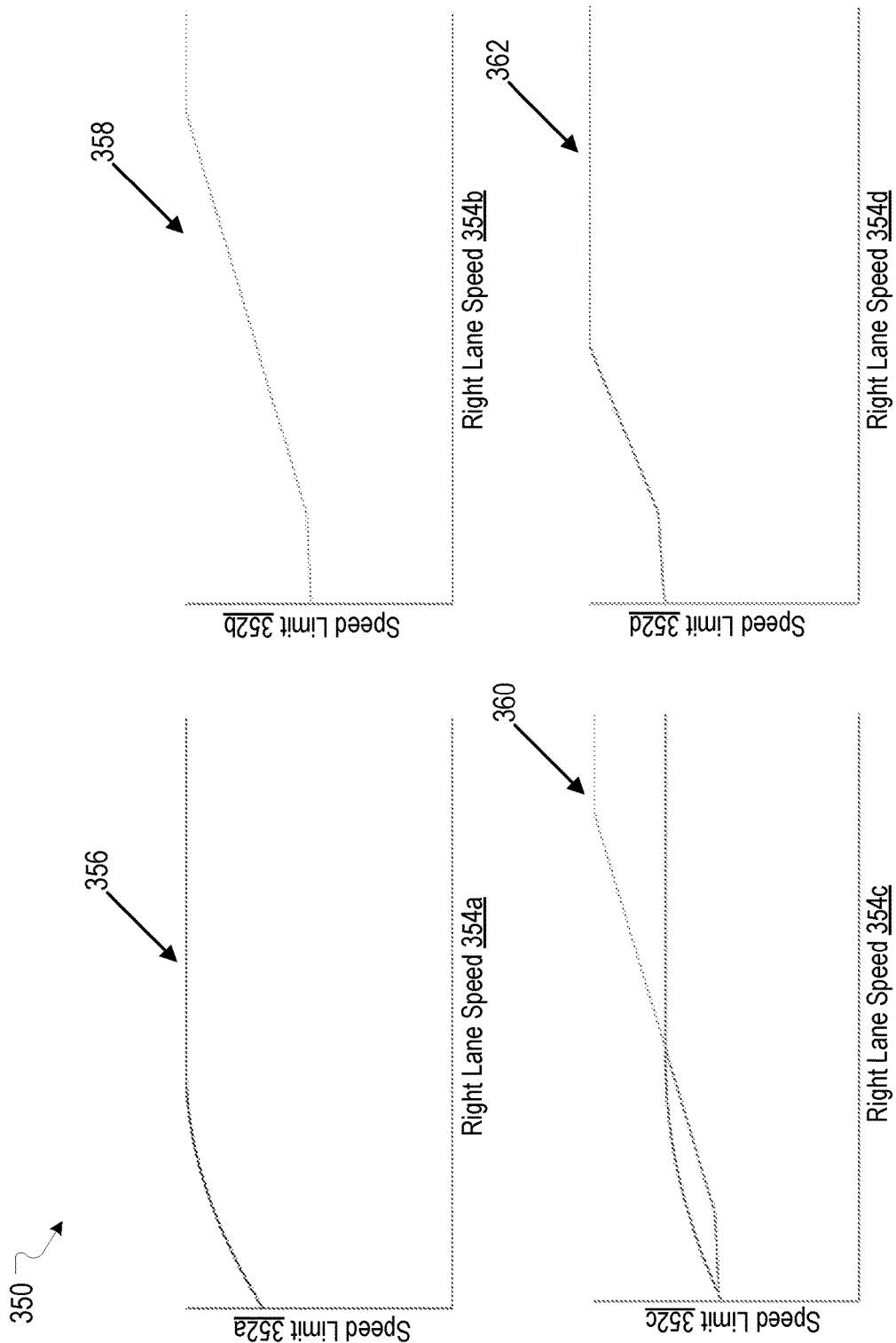
FIG. 3B illustrates example graphs associated with adaptive speed management, according to embodiments of the present technology.

FIG. 3B illustrate example graphs 350 associated with adaptive speed management, according to some embodiments of the present technology. The various functionality described herein for adaptive speed management can be performed by, for example, the speed management module 102 of FIG. 1. It should be understood that there can be additional, fewer, or alternative functionality or steps performed in similar or alternative orders, or in parallel, based on the various features and embodiments discussed herein unless otherwise stated.

As illustrated in FIG. 3B, the example graphs 350 illustrate speed limits 352a, 352b, 352c, 352d as they relate to right lane speeds 354a, 354b, 354c, 354c, 354d, respectively. In this example, the left lane speeds can be constant for illustrative purposes. Example graph 356 illustrates the speed limit 352a as it relates to the right lane speed 354a. In the example graph 356, the speed limit 352a can be determined based on a guided machine learning model. The guided machine learning model can determine the speed limit 352a based on a predetermined function. Example graph 358 illustrates the speed limit 352b as it relates to the right lane speed 354b. In the example graph 358, the speed limit 352b can be determined based on a compensated machine learning model. The compensated machine learning model can determine the speed limit 352b based on an interpolation function. Example graph 360 illustrates the speed limit 352c as it relates to the right lane speed 354c. In the example graph 360, the speed limit 352a of the example graph 356 and the speed limit 352b of the example graph 358 are overlaid to illustrate the speed limits generated by the guided machine learning model and the compensated machine learning model. Example graph 362 illustrates the speed limit 354d as it relates to the right lane speed 354d. In the example graph 362, the speed limit 352d can be determined based on a fusion of the speed limit 352a determined based on the guided machine learning model and the speed limit 352b determined based on the compensated machine learning model. Many variations are possible.

FIGS. 4A-4E illustrate examples associated with adaptive speed management in various scenarios, according to some embodiments of the present technology. The various functionality described herein for adaptive speed management can be performed by, for example, the speed management module 102 of FIG. 1. It should be understood that there can be additional, fewer, or alternative blocks, functionality, or steps performed in similar or alternative orders, or in parallel, based on the various features and embodiments discussed herein unless otherwise stated.

Figure 4A:
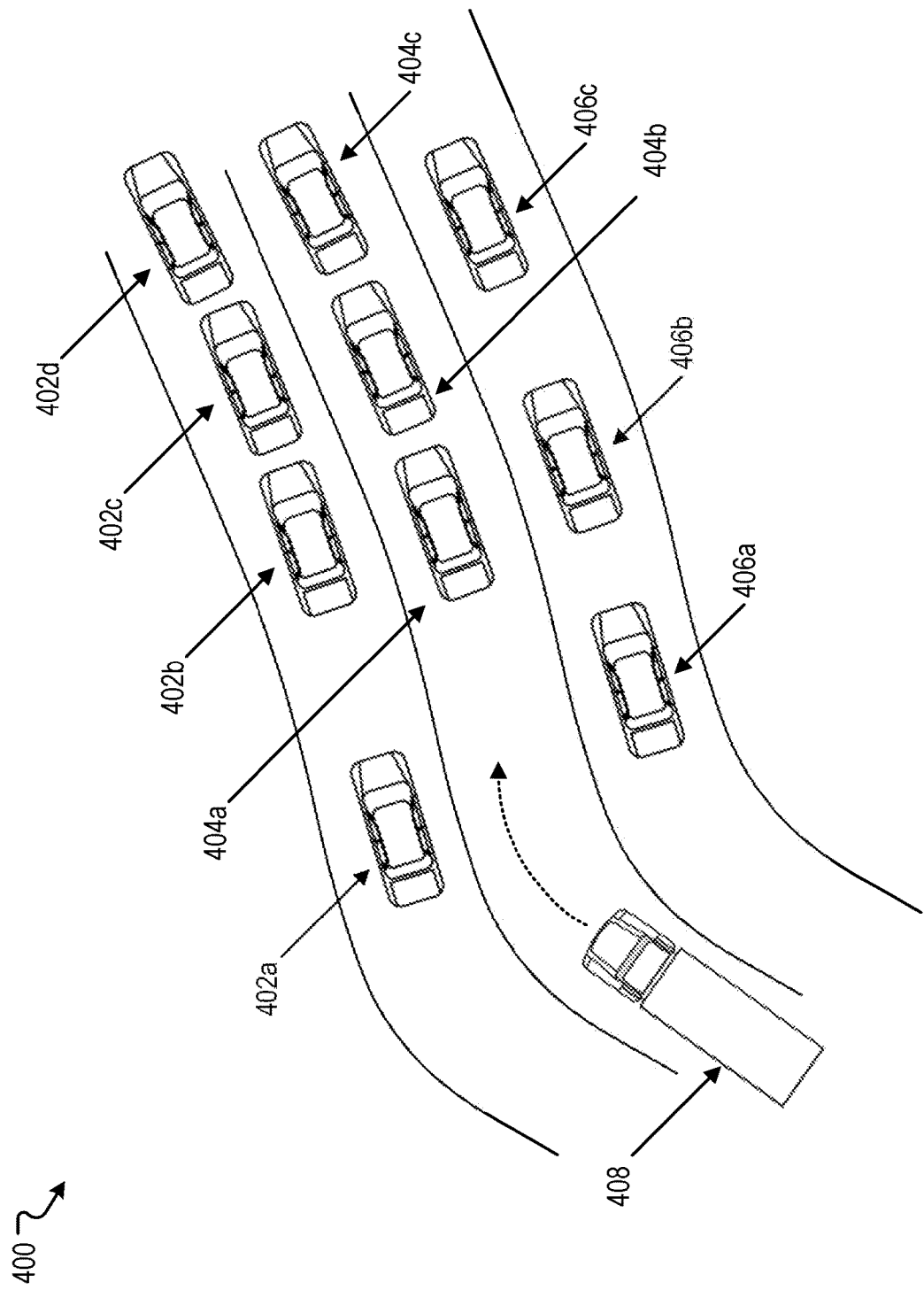
FIGS. 4A-4E illustrate examples associated with adaptive speed management, according to embodiments of the present technology.

FIG. 4A illustrates an example 400 of an ego vehicle 408 navigating a three-lane highway. In the left lane of the three-lane highway are vehicles 402a, 402b, 402c, 402d. In the middle lane (e.g., ego lane) of the three-lane highway are vehicles 404a, 404b, 404c. In the right lane of the three-lane highway are vehicles 406a, 406b, 406c. In this example, the ego vehicle 408 is approaching a curve in the three-lane highway and may not detect traffic in the middle lane from the vehicles 404a, 404b, 404c. However, the ego vehicle can detect traffic in the left lane from, for example, the vehicle 402a and traffic in the right lane from, for example, the vehicle 406a. A speed of traffic in the left lane can be determined based on the speed of detected obstacles in the left lane, such as the vehicle 402a. A speed of traffic in the right lane can be determined based on the speed of detected obstacles in the right lane, such as the vehicle 406a. A speed limit for the middle lane can be determined based on the speed of traffic in the left lane and the speed of traffic in the right lane. In this example, the ego vehicle 408 can begin to coast or brake based on the speed limit for the middle lane in anticipation of traffic in the middle lane. Many variations are possible.

Figure 4B:
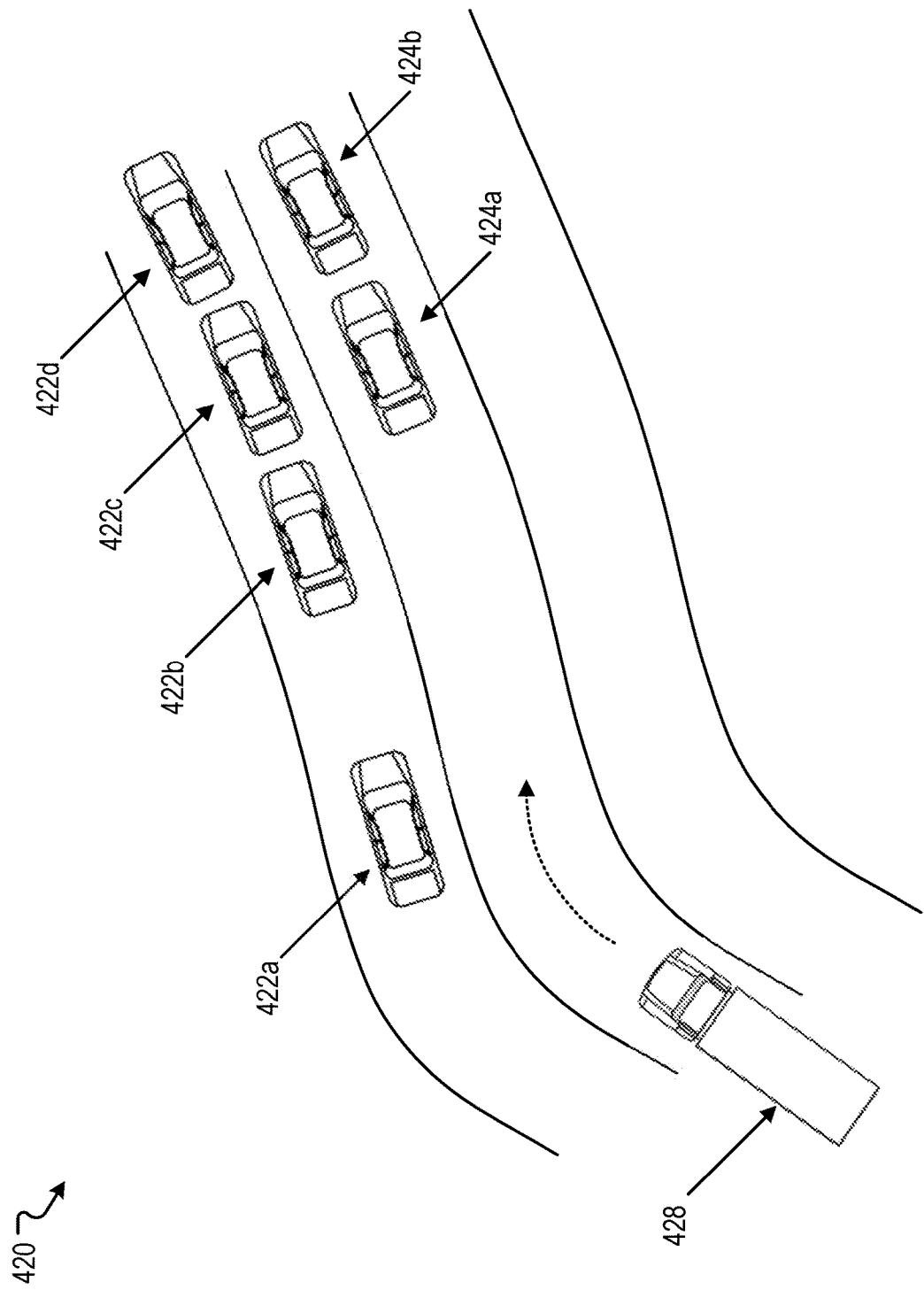

FIG. 4B illustrates an example 420 of an ego vehicle 428 navigating a three-lane highway. In the left lane of the three-lane highway are vehicles 422a, 422b, 422c, 422d. In the middle lane (e.g., ego lane) of the three-lane highway are vehicles 424a, 424b. There are no vehicles in the right lane. In this example, the ego vehicle 428 is approaching a curve in the three-lane highway and may not detect traffic in the middle lane from the vehicles 424a, 424b. However, the ego vehicle can detect traffic in the left lane from, for example, the vehicle 422a. A speed of traffic in the left lane can be determined based on detected obstacles in the left lane, such as the speed of the vehicle 422a. A speed limit for the middle lane can be determined based on the speed of traffic in the left lane. In this example, the ego vehicle 428 can begin to coast or brake based on the speed limit for the middle lane in anticipation of traffic in the middle lane. As illustrated in this example, determining speeds of traffic for adjacent lanes separately can account for situations where an adjacent lane has no vehicles. Many variations are possible.

Figure 4C:
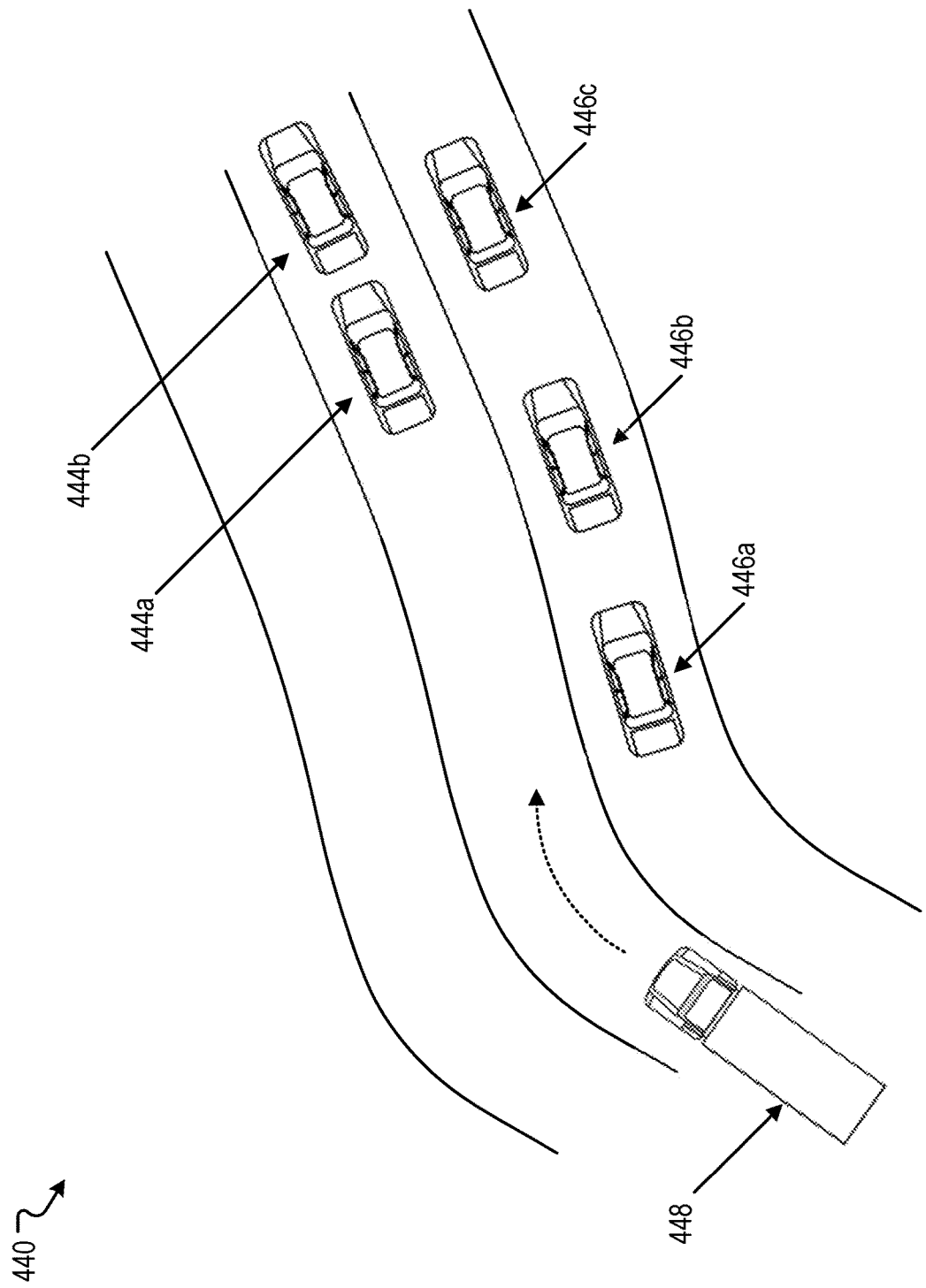

FIG. 4C illustrates an example 440 of an ego vehicle 448 navigating a three-lane highway. In the middle lane (e.g., ego lane) of the three-lane highway are vehicles 444a, 444b. In the right lane of the three-lane highway are vehicles 446a, 446b, 446c. There are no vehicles in the left lane. In this example, the ego vehicle 448 is approaching a curve in the three-lane highway and may not detect traffic in the middle lane from the vehicles 444a, 444b. However, the ego vehicle can detect traffic in the right lane from, for example, the vehicle 446a. A speed of traffic in the right lane can be determined based on detected obstacles in the right lane, such as the speed of the vehicle 446a. A speed limit for the middle lane can be determined based on the speed of traffic in the right lane. In this example, the ego vehicle 448 can begin to coast or brake based on the speed limit for the middle lane in anticipation of traffic in the middle lane. As also illustrated in this example, determining speeds of traffic for adjacent lanes separately can account for situations where an adjacent lane has no vehicles. Many variations are possible.

Figure 4D:
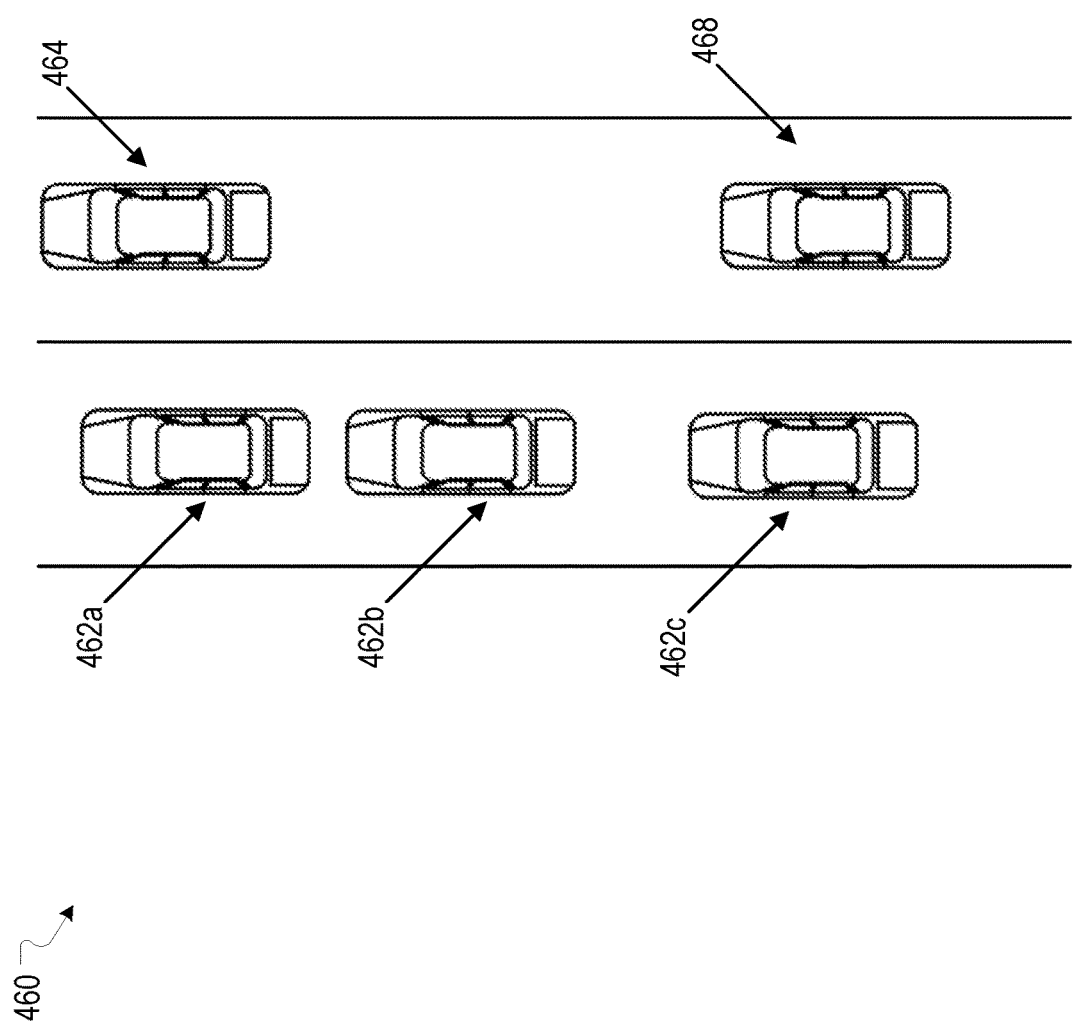

FIG. 4D illustrates an example 460 of an ego vehicle 468 navigating a three-lane highway. In the left lane of the three-lane highway are vehicles 462a, 462b, 462c. In the middle lane (e.g., ego lane) of the three-lane highway is vehicle 464. There are no vehicles in the right lane. In this example, space between the ego vehicle 468 and the vehicle 464 may suggest there is room to accelerate. However, the ego vehicle 468 can detect traffic in the left lane from the vehicles 462a, 462b, 462c. A speed of traffic in the left lane can be determined based on the speeds of the vehicles 462a, 462b, 462c. A speed limit for the middle lane can be determined based on the speed of traffic in the left lane. In this example, the ego vehicle 468 can begin to coast or maintain speed based on the speed limit for the middle lane in anticipation of a cut-in by, for example, the vehicle 462b. Many variations are possible.

Figure 4E:
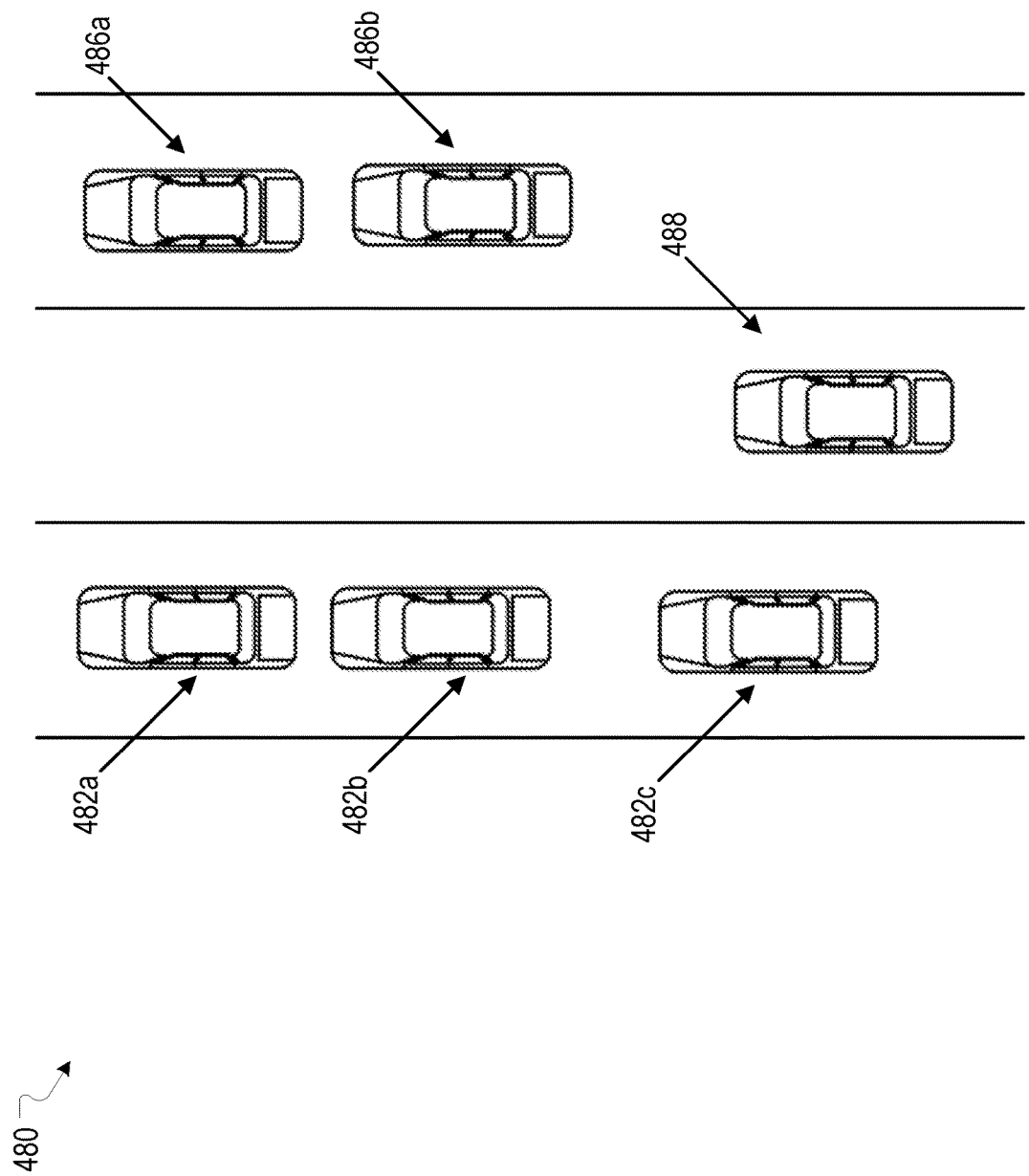

FIG. 4E illustrates an example 480 of an ego vehicle 488 navigating a three-lane highway. In the left lane of the three-lane highway are vehicles 482a, 482b, 482c. In the right lane of the three-lane highway are vehicles 486a, 486b. There are no vehicles in the middle lane (e.g., ego lane). In this example, the lack of vehicles in the middle lane may suggest there is room to accelerate. However, the ego vehicle 488 can detect traffic in the left lane from the vehicles 482a, 482b, 482c and traffic in the right lane from the vehicles 486a, 486b. A speed of traffic in the left lane can be determined based on the speeds of the vehicles 482a, 482b, 482c. A speed of traffic in the right lane can be determined based on the speeds of the vehicles 486a, 486b. A speed limit for the middle lane can be determined based on the speed of traffic in the left lane and the speed of traffic in the right lane. In this example, the ego vehicle 488 can begin to coast or maintain speed based on the speed limit for the middle lane in anticipation of a cut-in by, for example, the vehicle 482a, the vehicle 482b, the vehicle 486a, or the vehicle 486b. Many variations are possible.

Figure 5:
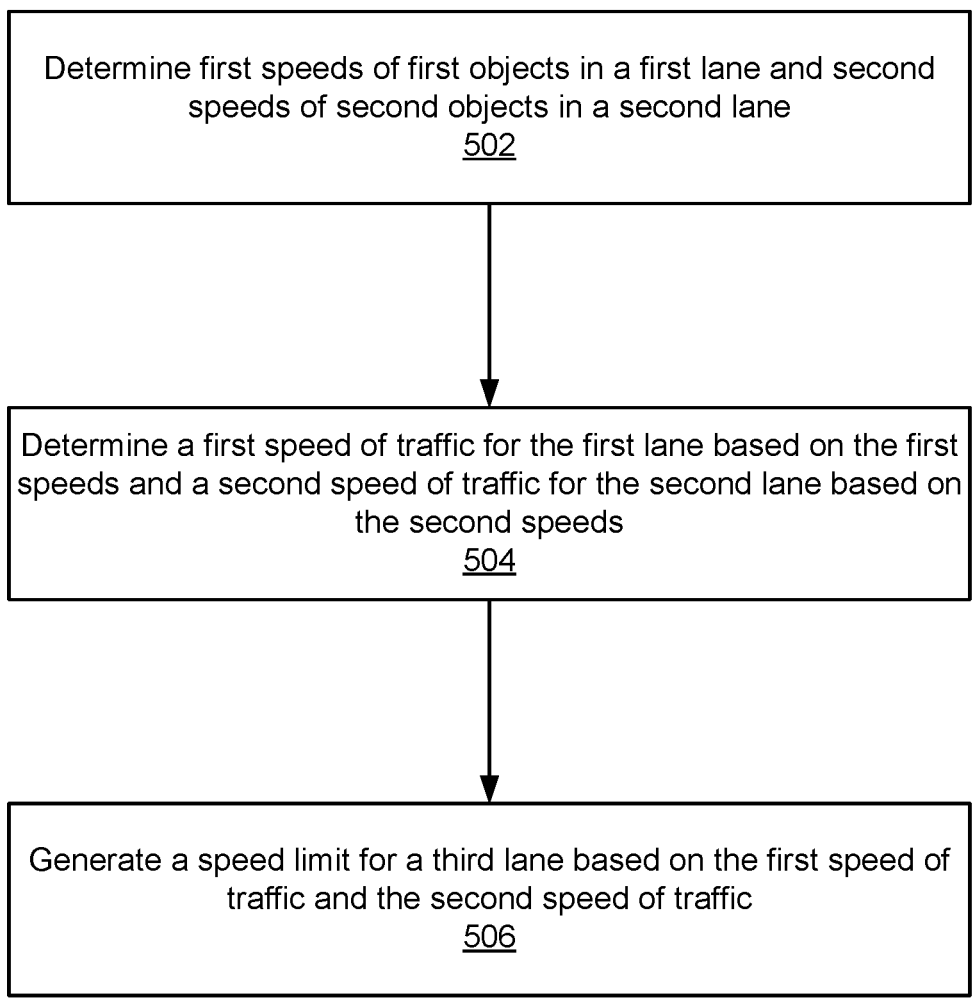
FIG. 5 illustrates an example method, according to embodiments of the present technology.

FIG. 5 illustrates an example method 500, according to embodiments of the present technology. At block 502, the example method 500 determines first speeds of first objects in a first lane and second speeds of second objects in a second lane. At block 504, the example method 500 determines a first speed of traffic based on the first speeds and a second speed of traffic for the second lane based on the second speeds. At block 506, the example method 500 generates a speed limit for a third lane based on the first speed of traffic and the second speed of traffic.

Many variations to the example method are possible. It should be appreciated that there can be additional, fewer, or alternative steps performed in similar or alternative orders, or in parallel, within the scope of the various embodiments discussed herein unless otherwise stated.

It is contemplated that there can be many other uses, applications, and/or variations associated with the various embodiments of the present technology. For example, various embodiments of the present technology can learn, improve, and/or be refined over time.

Example Implementations

Figure 6:
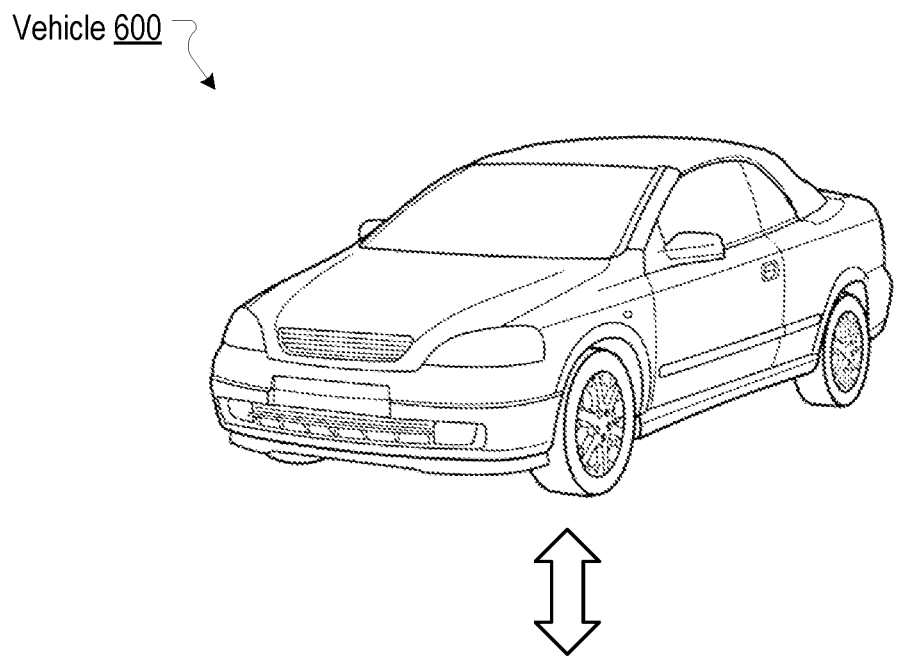
FIG. 6 illustrates an example vehicle, according to embodiments of the present technology.
Figure 6:
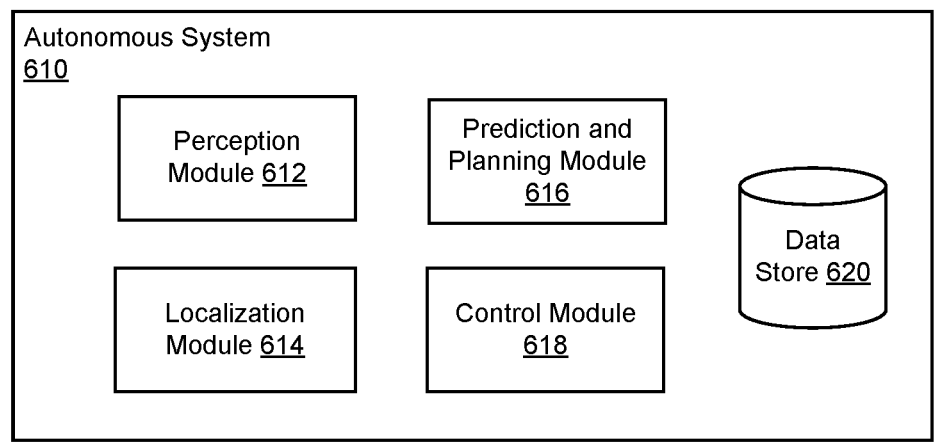

FIG. 6 illustrates a vehicle 600 including an autonomous system 610, according to various embodiments of the present technology. The functionality and operation of the present technology, including the autonomous system 610, can be implemented in whole or in part by the vehicle 600. The present technology can cause desired control and navigation of the vehicle 600, as described herein. In some embodiments, the vehicle 600 is a passenger vehicle (e.g., sedan, coupe, SUV). In some embodiments, the vehicle 600 is a truck, which can include a trailer. The truck can be of any size (e.g., medium truck, heavy truck, very heavy truck, etc.) or weight (e.g., greater than 14,000 pounds, greater than 26,000 pounds, greater than 70,000 pounds, etc.). The autonomous system 610 of the vehicle 600 can support and execute various modes of navigation of the vehicle 600. The autonomous system 610 can support and execute an autonomous driving mode, a semi-autonomous driving mode, and a driver assisted driving mode of the vehicle 600. The autonomous system 610 also can enable a manual driving mode. For operation of the vehicle 600, the autonomous system 610 can execute or enable one or more of the autonomous driving mode, the semi-autonomous driving mode, the driver assisted driving mode, and the manual driving mode, and selectively transition among the driving modes based on a variety of factors, such as operating conditions, vehicle capabilities, and driver preferences.

In some embodiments, the autonomous system 610 can include, for example, a perception module 612, a localization module 614, a prediction and planning module 616, and a control module 618. The functionality of the perception module 612, the localization module 614, the prediction and planning module 616, and the control module 618 of the autonomous system 610 are described in brief for purposes of illustration. The components (e.g., modules, elements, etc.) shown in this figure and all figures herein, as well as their described functionality, are exemplary only. Other implementations of the present technology may include additional, fewer, integrated, or different components and related functionality. Some components and related functionality may not be shown or described so as not to obscure relevant details. In various embodiments, one or more of the functionalities described in connection with the autonomous system 610 can be implemented in any suitable combinations.

The perception module 612 can receive and analyze various types of data about an environment in which the vehicle 600 is located. Through analysis of the various types of data, the perception module 612 can perceive the environment of the vehicle 600 and provide the vehicle 600 with critical information so that planning of navigation of the vehicle 600 is safe and effective. For example, the perception module 612 can determine the pose, trajectories, size, shape, and type of obstacles in the environment of the vehicle 600. Various models, such as machine learning models, can be utilized in such determinations.

The various types of data received by the perception module 812 can be any data that is supportive of the functionality and operation of the present technology. For example, the data can be attributes of the vehicle 600, such as location, velocity, acceleration, weight, and height of the vehicle 600. As another example, the data can relate to topographical features in the environment of the vehicle 600, such as traffic lights, road signs, lane markers, landmarks, buildings, structures, trees, curbs, bodies of water, etc. As yet another example, the data can be attributes of dynamic obstacles in the surroundings of the vehicle 600, such as location, velocity, acceleration, size, type, and movement of vehicles, persons, animals, road hazards, etc.

Sensors can be utilized to capture the data. The sensors can include, for example, cameras, radar, LiDAR (light detection and ranging), GPS (global positioning system), IMUs (inertial measurement units), and sonar. The sensors can be appropriately positioned at various locations (e.g., front, back, sides, top, bottom) on or in the vehicle 600 to optimize the collection of data. The data also can be captured by sensors that are not mounted on or in the vehicle 600, such as data captured by another vehicle (e.g., another truck) or by non-vehicular sensors located in the environment of the vehicle 600.

The localization module 614 can determine the pose of the vehicle 600. Pose of the vehicle 600 can be determined in relation to a map of an environment in which the vehicle 600 is travelling. Based on data received by the vehicle 600, the localization module 614 can determine distances and directions of features in the environment of the vehicle 600. The localization module 614 can compare features detected in the data with features in a map (e.g., HD map) to determine the pose of the vehicle 600 in relation to the map. The features in the map can include, for example, traffic lights, crosswalks, road signs, lanes, road connections, stop lines, etc. The localization module 614 can allow the vehicle 600 to determine its location with a high level of precision that supports optimal navigation of the vehicle 600 through the environment.

The prediction and planning module 616 can plan motion of the vehicle 600 from a start location to a destination location. The prediction and planning module 616 can generate a route plan, which reflects high level objectives, such as selection of different roads to travel from the start location to the destination location. The prediction and planning module 616 also can generate a behavioral plan with more local focus. For example, a behavioral plan can relate to various actions, such as changing lanes, merging onto an exit lane, turning left, passing another vehicle, etc. In addition, the prediction and planning module 616 can generate a motion plan for the vehicle 800 that navigates the vehicle 600 in relation to the predicted location and movement of other obstacles so that collisions are avoided. The prediction and planning module 616 can perform its planning operations subject to certain constraints. The constraints can be, for example, to ensure safety, to minimize costs, and to enhance comfort.

Based on output from the prediction and planning module 616, the control module 618 can generate control signals that can be communicated to different parts of the vehicle 600 to implement planned vehicle movement. The control module 618 can provide control signals as commands to actuator subsystems of the vehicle 600 to generate desired movement. The actuator subsystems can perform various functions of the vehicle 600, such as braking, acceleration, steering, signaling, etc.

The autonomous system 610 can include a data store 620. The data store 620 can be configured to store and maintain information that supports and enables operation of the vehicle 600 and functionality of the autonomous system 610. The information can include, for example, instructions to perform the functionality of the autonomous system 610, data captured by sensors, data received from a remote computing system, parameter values reflecting vehicle states, localization data, machine learning models, algorithms, vehicle operation rules and constraints, navigation plans, etc.

The autonomous system 610 of the vehicle 600 can communicate over a communications network with other computing systems to support navigation of the vehicle 600. The communications network can be any suitable network through which data can be transferred between computing systems. Communications over the communications network involving the vehicle 600 can be performed in real time (or near real time) to support navigation of the vehicle 600.

The autonomous system 610 can communicate with a remote computing system (e.g., server, server farm, peer computing system) over the communications network. The remote computing system can include an autonomous system, and perform some or all of the functionality of the autonomous system 610. In some embodiments, the functionality of the autonomous system 610 can be distributed between the vehicle 600 and the remote computing system to support navigation of the vehicle 600. For example, some functionality of the autonomous system 610 can be performed by the remote computing system and other functionality of the autonomous system 610 can be performed by the vehicle 600. In some embodiments, a fleet of vehicles including the vehicle 600 can communicate data captured by the fleet to a remote computing system controlled by a provider of fleet management services. The remote computing system in turn can aggregate and process the data captured by the fleet. The processed data can be selectively communicated to the fleet, including vehicle 600, to assist in navigation of the fleet as well as the vehicle 600 in particular. In some embodiments, the autonomous system 610 of the vehicle 600 can directly communicate with a remote computing system of another vehicle. For example, data captured by the other vehicle can be provided to the vehicle 600 to support navigation of the vehicle 600, and vice versa. The vehicle 600 and the other vehicle can be owned by the same entity in some instances. In other instances, the vehicle 600 and the other vehicle can be owned by different entities.

In various embodiments, the functionalities described herein with respect to the present technology can be implemented, in part or in whole, as software, hardware, or any combination thereof. In some cases, the functionalities described with respect to the present technology can be implemented, in part or in whole, as software running on one or more computing devices or systems. In a further example, the functionalities described with respect to the present technology can be implemented using one or more computing devices or systems that include one or more servers, such as network servers or cloud servers. It should be understood that there can be many variations or other possibilities.

Figure 7:
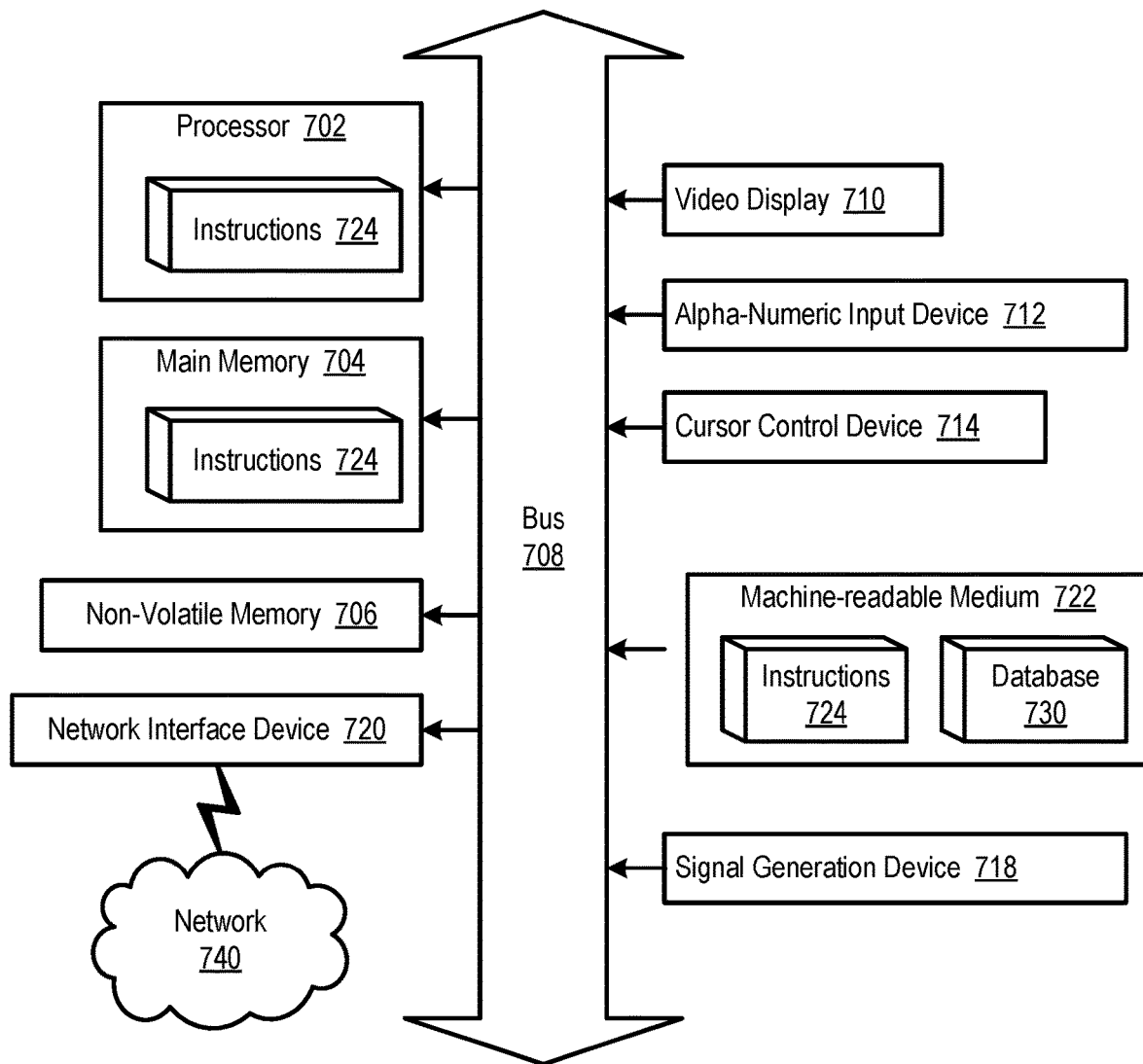
FIG. 7 illustrates an example computing system, according to embodiments of the present technology.

FIG. 7 illustrates an example of a computer system 700 that may be used to implement one or more of the embodiments of the present technology. The computer system 700 can be included in a wide variety of local and remote machine and computer system architectures and in a wide variety of network and computing environments that can implement the functionalities of the present technology. The computer system 700 includes sets of instructions 724 for causing the computer system 700 to perform the functionality, features, and operations discussed herein. The computer system 700 may be connected (e.g., networked) to other machines and/or computer systems. In a networked deployment, the computer system 700 may operate in the capacity of a server or a client machine in a client-server network environment, or as a peer machine in a peer-to-peer (or distributed) network environment.

The computer system 700 includes a processor 702 (e.g., a central processing unit (CPU), a graphics processing unit (GPU), or both), a main memory 704, and a nonvolatile memory 706 (e.g., volatile RAM and non-volatile RAM, respectively), which communicate with each other via a bus 708. In some embodiments, the computer system 700 can be a desktop computer, a laptop computer, personal digital assistant (PDA), or mobile phone, for example. In one embodiment, the computer system 700 also includes a video display 710, an alphanumeric input device 712 (e.g., a keyboard), a cursor control device 714 (e.g., a mouse), a signal generation device 718 (e.g., a speaker) and a network interface device 720.

In one embodiment, the video display 710 includes a touch sensitive screen for user input. In one embodiment, the touch sensitive screen is used instead of a keyboard and mouse. The machine-readable medium 722 on which is stored one or more sets of instructions 724 (e.g., software) embodying any one or more of the methodologies, functions, or operations described herein. The instructions 724 can also reside, completely or at least partially, within the main memory 704 and/or within the processor 702 during execution thereof by the computer system 700. The instructions 724 can further be transmitted or received over a network 740 via the network interface device 720. In some embodiments, the machine-readable medium 922 also includes a database 730.

Volatile RAM may be implemented as dynamic RAM (DRAM), which requires power continually in order to refresh or maintain the data in the memory. Non-volatile memory is typically a magnetic hard drive, a magnetic optical drive, an optical drive (e.g., a DVD RAM), or other type of memory system that maintains data even after power is removed from the system. The non-volatile memory 706 may also be a random access memory. The non-volatile memory 706 can be a local device coupled directly to the rest of the components in the computer system 700. A non-volatile memory that is remote from the system, such as a network storage device coupled to any of the computer systems described herein through a network interface such as a modem or Ethernet interface, can also be used.

While the machine-readable medium 722 is shown in an exemplary embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding, or carrying a set of instructions for execution by the machine and that cause the machine to perform any one or more of the methodologies of the present technology. Examples of machine-readable media (or computer-readable media) include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 700 to perform any one or more of the processes and features described herein.

In general, routines executed to implement the embodiments of the invention can be implemented as part of an operating system or a specific application, component, program, object, module, or sequence of instructions referred to as "programs" or "applications." For example, one or more programs or applications can be used to execute any or all of the functionality, techniques, and processes described herein. The programs or applications typically comprise one or more instructions set at various times in various memory and storage devices in the machine and that, when read and executed by one or more processors, cause the computing system 700 to perform operations to execute elements involving the various aspects of the embodiments described herein.

The executable routines and data may be stored in various places, including, for example, ROM, volatile RAM, non-volatile memory, and/or cache memory. Portions of these routines and/or data may be stored in any one of these storage devices. Further, the routines and data can be obtained from centralized servers or peer-to-peer networks. Different portions of the routines and data can be obtained from different centralized servers and/or peer-to-peer networks at different times and in different communication sessions, or in a same communication session. The routines and data can be obtained in entirety prior to the execution of the applications. Alternatively, portions of the routines and data can be obtained dynamically, just in time, when needed for execution. Thus, it is not required that the routines and data be on a machine-readable medium in entirety at a particular instance of time.

While embodiments have been described fully in the context of computing systems, those skilled in the art will appreciate that the various embodiments are capable of being distributed as a program product in a variety of forms, and that the embodiments described herein apply equally regardless of the particular type of machine- or computer-readable media used to actually affect the distribution.

Alternatively, or in combination, the embodiments described herein can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

For purposes of explanation, numerous specific details are set forth in order to provide a thorough understanding of the description. It will be apparent, however, to one skilled in the art that embodiments of the technology can be practiced without these specific details. In some instances, modules, structures, processes, features, and devices are shown in block diagram form in order to avoid obscuring the description or discussed herein. In other instances, functional block diagrams and flow diagrams are shown to represent data and logic flows. The components of block diagrams and flow diagrams (e.g., modules, engines, blocks, structures, devices, features, etc.) may be variously combined, separated, removed, reordered, and replaced in a manner other than as expressly described and depicted herein.

Reference in this specification to "one embodiment," "an embodiment," "other embodiments," "another embodiment," "in various embodiments," "in an example," "in one implementation," or the like means that a particular feature, design, structure, or characteristic described in connection with the embodiment is included in at least one embodiment of the technology. The appearances of, for example, the phrases "according to an embodiment," "in one embodiment," "in an embodiment," "in various embodiments," or "in another embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments but also variously omitted in other embodiments. Similarly, various features are described which may be preferences or requirements for some embodiments but not other embodiments.

Although embodiments have been described with reference to specific exemplary embodiments, it will be evident that the various modifications and changes can be made to these embodiments. Accordingly, the specification and drawings are to be regarded in an illustrative sense rather than in a restrictive sense. The foregoing specification provides a description with reference to specific exemplary embodiments. It will be evident that various modifications can be made thereto without departing from the broader spirit and scope as set forth in the following claims. The specification and drawings are, accordingly, to be regarded in an illustrative sense rather than a restrictive sense.

Although some of the drawings illustrate a number of operations or method steps in a particular order, steps that are not order dependent may be reordered and other steps may be combined or omitted. While some reordering or other groupings are specifically mentioned, others will be apparent to those of ordinary skill in the art and so do not present an exhaustive list of alternatives. Moreover, it should be recognized that the stages could be implemented in hardware, firmware, software, or any combination thereof.

It should also be understood that a variety of changes may be made without departing from the essence of the invention. Such changes are also implicitly included in the description. They still fall within the scope of this invention. It should be understood that this technology is intended to yield a patent covering numerous aspects of the invention, both independently and as an overall system, and in method, computer readable medium, and apparatus modes.

Further, each of the various elements of the invention and claims may also be achieved in a variety of manners. This technology should be understood to encompass each such variation, be it a variation of an embodiment of any apparatus (or system) embodiment, a method or process embodiment, a computer readable medium embodiment, or even merely a variation of any element of these.

Further, the use of the transitional phrase "comprising" is used to maintain the "open-end" claims herein, according to traditional claim interpretation. Thus, unless the context requires otherwise, it should be understood that the term "comprise" or variations such as "comprises" or "comprising," are intended to imply the inclusion of a stated element or step or group of elements or steps, but not the exclusion of any other element or step or group of elements or steps. Such terms should be interpreted in their most expansive forms so as to afford the applicant the broadest coverage legally permissible in accordance with the following claims.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the technology of the embodiments of the invention is intended to be illustrative, but not limiting, of the scope of the invention, which is set forth in the following claims.

What is claimed is:

1. A computer-implemented method comprising:
    determining, by a computing system, first speeds of first objects in a first lane and second speeds of second objects in a second lane;
    determining, by the computing system, a first speed of traffic for the first lane based on a first weighted average of the first speeds and a second speed of traffic for the second lane based on a second weighted average of the second speeds, wherein the first speeds are weighted based on first distances between the first objects and a vehicle, wherein the second speeds are weighted based on second distances between the second objects and the vehicle, and wherein the first speed of traffic is limited to a first threshold difference from a first previous speed of traffic for the first lane and the second speed of traffic is limited to a second threshold difference from a second previous speed of traffic for the second lane, the first speed of traffic and the second speed of traffic based on current values of, respectively, the first speeds and the second speeds determined during navigation of the vehicle;
    generating, by the computing system, a desired upper speed bound for a third lane based on the first speed of traffic and the second speed of traffic; and
    causing, by the computing system, a change in speed of the vehicle in the third lane based on the desired upper speed bound for the third lane.

2. The computer-implemented method of claim 1, wherein
    the first speeds of the first objects that are closer to the vehicle are weighted higher than the first speeds of the first objects that are farther from the vehicle, and the second speeds of the second objects that are closer to the vehicle are weighted higher than the second speeds of the second objects that are farther from the vehicle.

3. The computer-implemented method of claim 1, wherein the desired upper speed bound is generated by a machine learning model, and wherein the machine learning model is trained to learn a nonlinear function to generate the desired upper speed bound.

4. The computer-implemented method of claim 1, wherein the desired upper speed bound is generated by a machine learning model, and wherein the machine learning model is trained to apply a predetermined function to generate the desired upper speed bound.

5. The computer-implemented method of claim 1, wherein the desired upper speed bound is generated by a machine learning model, and wherein the machine learning model is trained to apply an interpolation function between a minimum bound and a maximum upper speed bound to generate the desired upper speed bound.

6. The computer-implemented method of claim 1, wherein the desired upper speed bound is generated based on a plurality of upper speed bounds generated by a plurality of machine learning models.

7. The computer-implemented method of claim 1, wherein the desired upper speed bound is generated by a machine learning model, and wherein the machine learning model is trained based on instances of driving scenarios and speed ranges identified for the driving scenarios.

8. The computer-implemented method of claim 1, further comprising:
   determining, by the computing system, a road geometry associated with the first lane and the second lane, wherein the desired upper speed bound for the third lane is generated based on the road geometry.

9. The computer-implemented method of claim 1, wherein determining, the first speeds of the first objects in the first lane and the second speeds of the second objects in the second lane comprises:
   filtering, by the computing system, the first objects to remove the first objects that do not contribute to the first speed of traffic, wherein the first speeds of the first objects are relative to a first direction of the first lane; and
   filtering, by the computing system, the second objects to remove the second objects that do not contribute to the second speed of traffic, wherein the second speeds of the second objects are relative to a second direction of the second lane.

10. The computer-implemented method of claim 1, wherein the first previous speed of traffic is based on first previous speeds of traffic and the second previous speed of traffic is based on second previous speeds of traffic.

11. A system comprising:
    at least one processor; and
    a memory storing instructions that, when executed by the at least one processor, cause the system to perform operations comprising:
       determining first speeds of first objects in a first lane and second speeds of second objects in a second lane;
       determining a first speed of traffic for the first lane based on a first weighted average of the first speeds and a second speed of traffic for the second lane based on a second weighted average of the second speeds, wherein the first speeds are weighted based on first distances between the first objects and a vehicle, wherein the second speeds are weighted based on second distances between the second objects and the vehicle, and wherein the first speed of traffic is limited to a first threshold difference from a first previous speed of traffic for the first lane and the second speed of traffic is limited to a second threshold difference from a second previous speed of traffic for the second lane, the first speed of traffic and the second speed of traffic based on current values of, respectively, the first speeds and the second speeds determined during navigation of the vehicle;
       generating a desired upper speed bound for a third lane based on the first speed of traffic and the second speed of traffic; and
       causing a change in speed of the vehicle in the third lane based on the desired upper speed bound for the third lane.

12. The system of claim 11, wherein
    the first speeds of the first objects that are closer to the vehicle are weighted higher than the first speeds of the first objects that are farther from the vehicle, and the second speeds of the second objects that are closer to the vehicle are weighted higher than the second speeds of the second objects that are farther from the vehicle.

13. The system of claim 11, wherein the desired upper speed bound is generated by a machine learning model, and wherein the machine learning model is trained to learn a nonlinear function to generate the desired upper speed bound.

14. The system of claim 11, wherein the desired upper speed bound is generated by a machine learning model, and wherein the machine learning model is trained to apply a predetermined function to generate the desired upper speed bound.

15. The system of claim 11, wherein the desired upper speed bound is generated by a machine learning model, and wherein the machine learning model is trained to apply an interpolation function between a minimum upper speed bound and a maximum upper speed bound to generate the desired upper speed bound.

16. A non-transitory computer-readable storage medium including instructions that, when executed by at least one processor of a computing system, cause the computing system to perform operations comprising:
    determining first speeds of first objects in a first lane and second speeds of second objects in a second lane;
    determining a first speed of traffic for the first lane based on a first weighted average of the first speeds and a second speed of traffic for the second lane based on a second weighted average of the second speeds, wherein the first speeds are weighted based on first distances between the first objects and a vehicle, wherein the second speeds are weighted based on second distances between the second objects and the vehicle, and wherein the first speed of traffic is limited to a first threshold difference from a first previous speed of traffic for the first lane and the second speed of traffic is limited to a second threshold difference from a second previous speed of traffic for the second lane, the first speed of traffic and the second speed of traffic based on current values of, respectively, the first speeds and the second speeds determined during navigation of the vehicle;
    generating a desired upper speed bound for a third lane based on the first speed of traffic and the second speed of traffic; and
    causing a change in speed of the vehicle in the third lane based on the desired upper speed bound for the third lane.

17. The non-transitory computer-readable storage medium of claim 16, wherein
    the first speeds of the first objects that are closer to the vehicle are weighted higher than the first speeds of the first objects that are farther from the vehicle, and the second speeds of the second objects that are closer to the vehicle are weighted higher than the second speeds of the second objects that are farther from the vehicle.

18. The non-transitory computer-readable storage medium of claim 16, wherein the desired upper speed bound is generated by a machine learning model, and wherein the machine learning model is trained to learn a nonlinear function to generate the desired upper speed bound.

19. The non-transitory computer-readable storage medium of claim 16, wherein the desired upper speed bound is generated by a machine learning model, and wherein the machine learning model is trained to apply a predetermined function to generate the desired upper speed bound.

20. The non-transitory computer-readable storage medium of claim 16, wherein the desired upper speed bound is generated by a machine learning model, and wherein the machine learning model is trained to apply an interpolation function between a minimum upper speed bound and a maximum upper speed bound to generate the desired upper speed bound.

* * * * *